United States Patent [19]

Lagoutte et al.

[11] 4,355,968
[45] Oct. 26, 1982

[54] APPARATUS FOR PRODUCING HOLLOW PLASTIC BOTTLES BY THERMAL HEATING AND BLOW MOLD EXPANSION

[75] Inventors: Serge Lagoutte, Buxy; Alain G. Franchet, St. Etienne du Rouvray, both of France

[73] Assignee: Pont-A-Mousson S.A., Nancy, France

[21] Appl. No.: 245,305

[22] Filed: Mar. 19, 1981

[30] Foreign Application Priority Data

Mar. 26, 1980 [FR] France ................................ 80 06668

[51] Int. Cl.³ .................................... B29C 17/07
[52] U.S. Cl. .................................... 425/526; 264/535; 432/124
[58] Field of Search .................... 264/535; 425/526; 432/11, 124

[56] References Cited

U.S. PATENT DOCUMENTS

| | | | |
|---|---|---|---|
| 3,650,656 | 3/1972 | Schmid | 425/526 |
| 3,995,990 | 12/1976 | Duyer et al. | 432/124 X |
| 4,036,927 | 7/1977 | Stolki | 264/535 X |
| 4,056,590 | 11/1977 | Farrell | 264/538 X |
| 4,233,010 | 11/1980 | Suzuki | 425/526 X |

*Primary Examiner*—Jan H. Silbaugh
*Attorney, Agent, or Firm*—Sughrue, Mion, Zinn, Macpeak and Seas

[57] ABSTRACT

Plastic bottle blanks (1) are rotated and conveyed neck down through a rotary thermal heating station (3), and neck up to a transfer station (5) and through a blow molding station (4), thus making it possible to simultaneously hold the blanks by their necks during the entire treatment and to easily remove the finished hollow bottles by gravity.

11 Claims, 16 Drawing Figures

FIG.12

APPARATUS FOR PRODUCING HOLLOW PLASTIC BOTTLES BY THERMAL HEATING AND BLOW MOLD EXPANSION

BACKGROUND OF THE INVENTION

This invention relates to an apparatus for manufacturing hollow bodies by thermal treatment followed by blowing the preformed cylinders made of plastic material, and is designed particularly for manufacturing bottles and flasks from plastic material. The bottles start as preformed blanks made by injection molding, extrusion, blowing or the like. These blanks generally have a cylindrical tubular shape, closed at one end and open at the other, forming the neck of the bottle, thus already giving the bottle its definitive shape.

Known manufacturing installations of this type generally comprise a station where the preformed shapes are thermally treated to raise the blanks to a temperature at which they can be shaped by blowing. These installations also comprise a transfer station supplying the thermal treatment station, a blowing station where the blanks are given their final hollow body shape in molds, and a transfer station where the blanks are transported from the thermal treatment station to the blowing station.

With known installations of this type each blank is held in the same position throughout the entire process, particularly in the treatment station and in the blowing station, but maintaining this attitude is disadvantageous in one or the other of the two stations.

Thus, in some of these installations, the blank is held vertically with its open neck above. This position is not conducive to satisfactory thermal heating of the blank because as the heat of the blank begins to climb, the upward pointing neck is also heated and therefore tends to be deformed and to lose its definitive configuration.

In other known installations the blank is vertical with the opening or neck directed downward. This position proves satisfactory at the time of thermal treatment but is, in contrast, disadvantageous during transport from the thermal treatment station to the blowing station. In effect, the material forming the blank is soft when leaving the thermal treatment station, and the portion of the blank situated above its support tends to deform under the effect of its own weight. For this reason a threaded rod is generally provided during the entire thermal treatment in these installations to assure that the blank does not lose its shape while being transferred from the thermal treatment station to the blowing station, thereby complicating the installation. In addition, removing the finished hollow bodies is relatively complicated.

SUMMARY OF THE INVENTION

The object of the invention is to provide an installation having none of these disadvantages. This is implemented by an apparatus comprising a station where the blanks are thermally treated, a station which transfers the blanks to the treatment station, a station where the blanks are blown in molds, and a transfer station moving the blanks from the thermal treatment station to the blowing station, said installation being characterized by means for moving the blanks with their openings directed downward in the treatment station and with their openings directed upward in the transfer and blowing stations.

In one embodiment of the invention, which facilitates transferring the blanks, the thermal treatment station comprises support apparatus adapted to grasp the blanks with their openings directed upward and means for inverting them.

Because the neck of the blank is kept cool when secured in this manner, the neck can be used to directly manipulate the blanks from one station to another. Thus, in one preferred embodiment each support apparatus comprises a sliding rod provided with a grasping organ, which grasps the inside of the neck of one blank, and means for manipulating the rod between two active positions and retracting it in synchronization with the movement of the support apparatus. The transfer station comprises parts which grasp the neck, activated in synchronization with these rods, and the blowing station comprises parts to grasp each blank by its neck when leaving the transfer station. This eliminates the need to transfer the blank supports at the same time as the blanks from one station to another and to then recycle the supports, and reduces the number of these supports to only that number necessary to keep blanks at the thermal treatment station. The cost of the installation is thus reduced.

DETAILED DESCRIPTION OF THE PREFERRED EMBODIMENTS

Referring to the embodiment shown in FIGS. 1–16, the invention relates to an installation for thermal treatment followed by blowing of bottle blanks 1 made of plastic material and produced, for example, by an injection molding machine. The blanks thus formed are transferred from one or more storage containers (not shown) by a rack 2 to a thermal treatment station 3 where they are heated to the temperature necessary to blow them. Then they are transferred to a blowing apparatus 4 by a transfer apparatus 5. After blowing in the molds at the blowing station, the formed bottles are ejected to a removal apparatus (not shown) in the direction of arrow f in FIG. 1.

Figure 4:
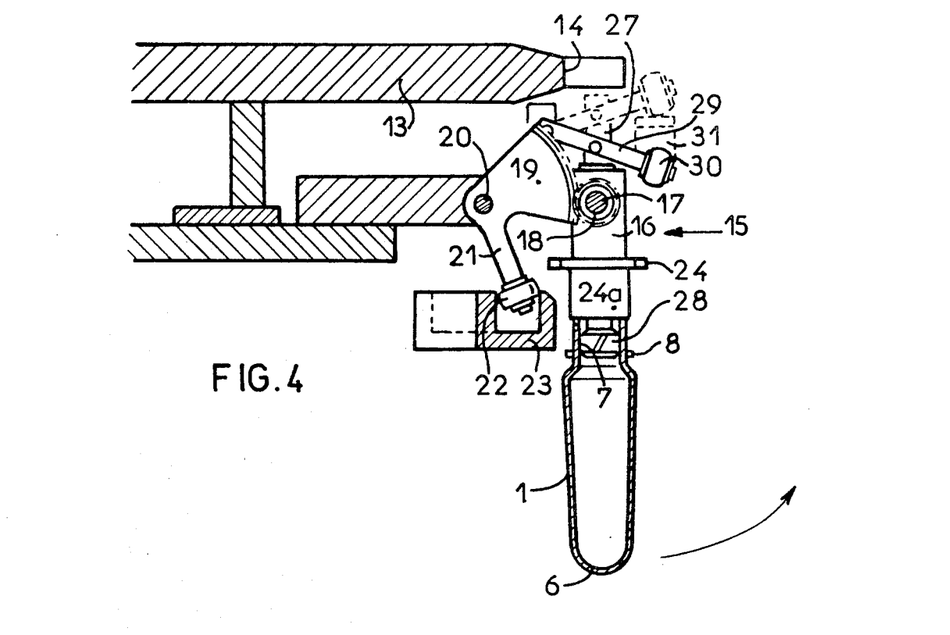
FIG. 4 is a cross-sectional view in larger scale than FIG. 2 of a blank support apparatus of the thermal treatment station with the blank being in its initial position.
Figure 5:
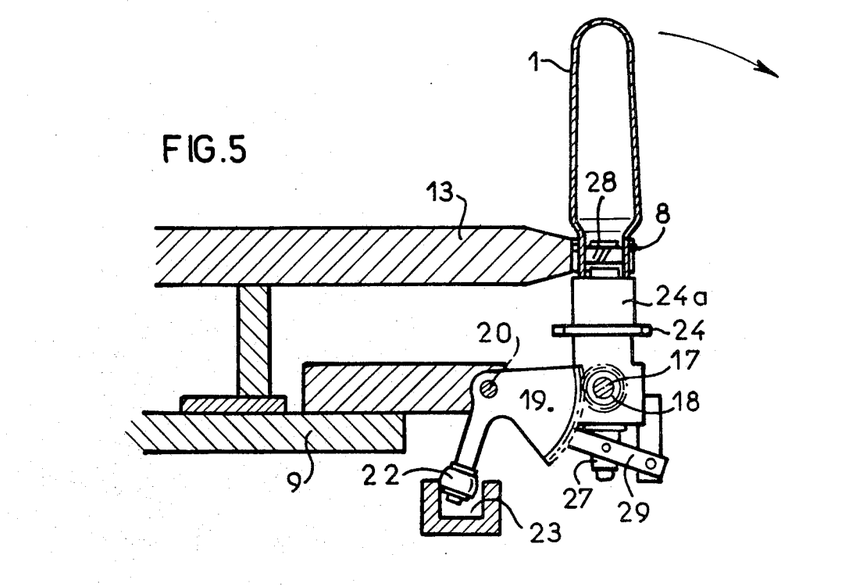
FIG. 5 is a view analogous to FIG. 4 but showing the blank in the return or inverted position.
Figure 6:
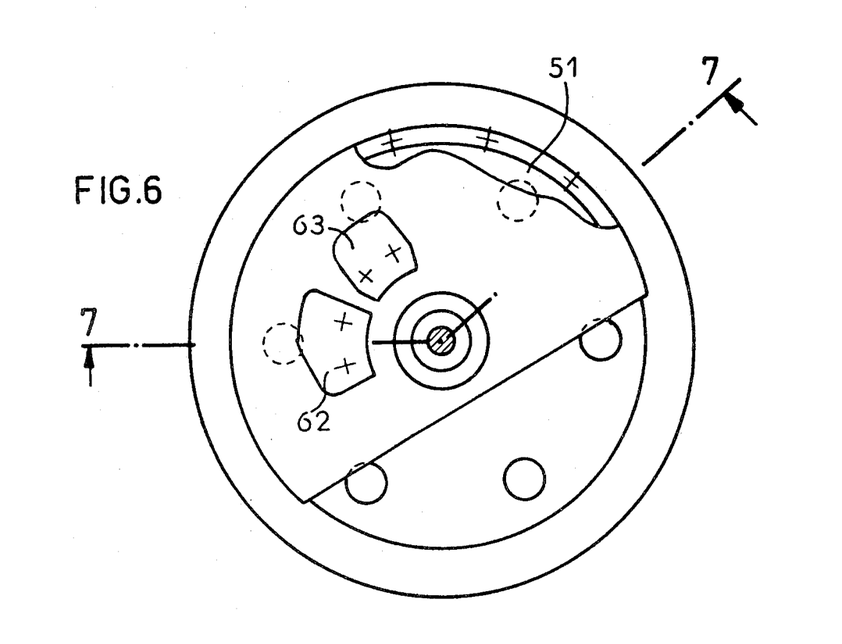
FIG. 6 is a schematic plan view in larger scale of the transfer station.
Figure 7:
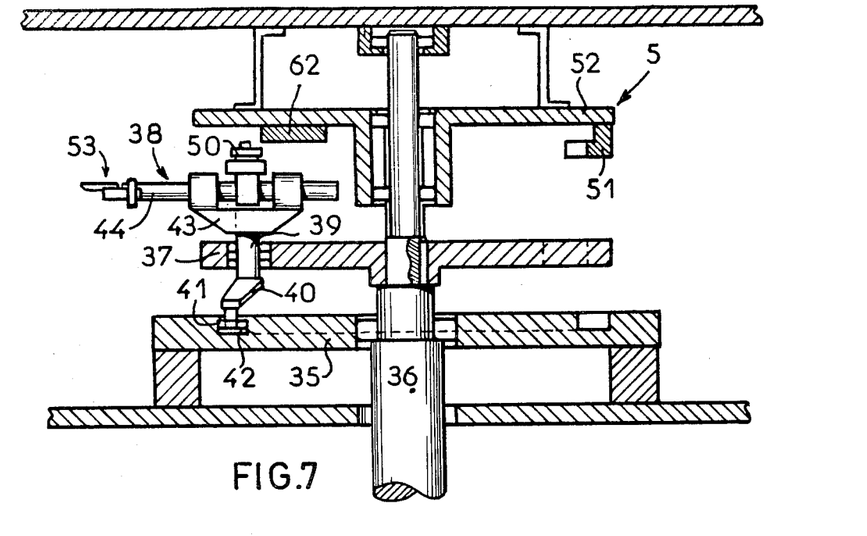
FIG. 7 is a sectional view taken along line 7—7 of FIG. 6.
Figure 8:
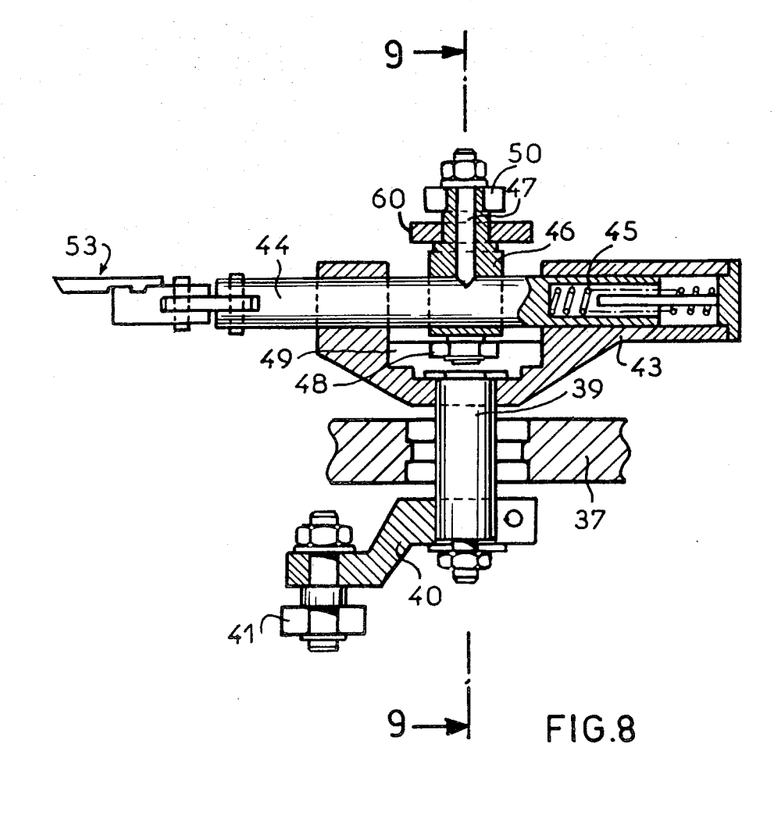
FIG. 8 is an enlarged schematic view of an arm of the transfer station.
Figure 9:
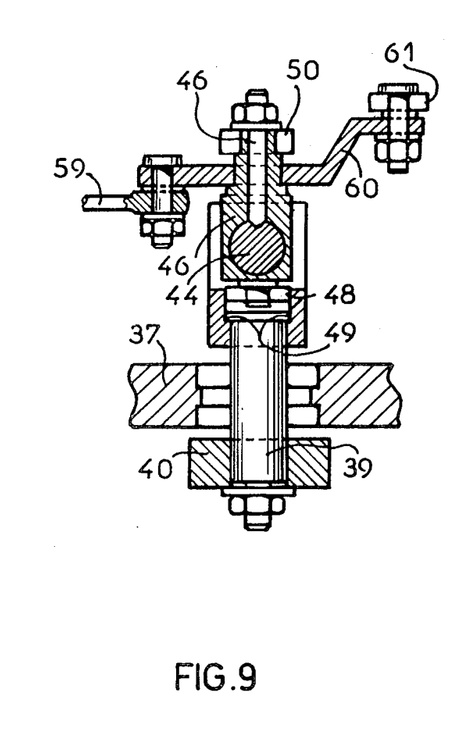
FIG. 9 is a sectional view taken along line 9—9 of FIG. 8.
Figure 10:
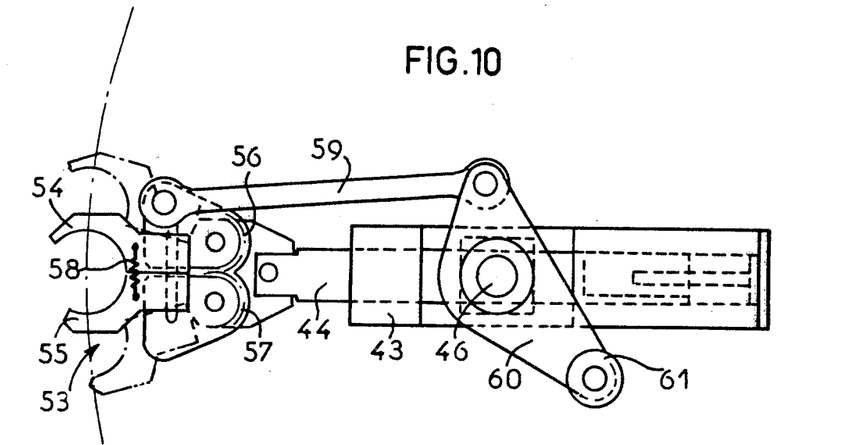
FIG. 10 is a schematic plan view of the arm in FIGS. 8 and 9.
Figure 11:
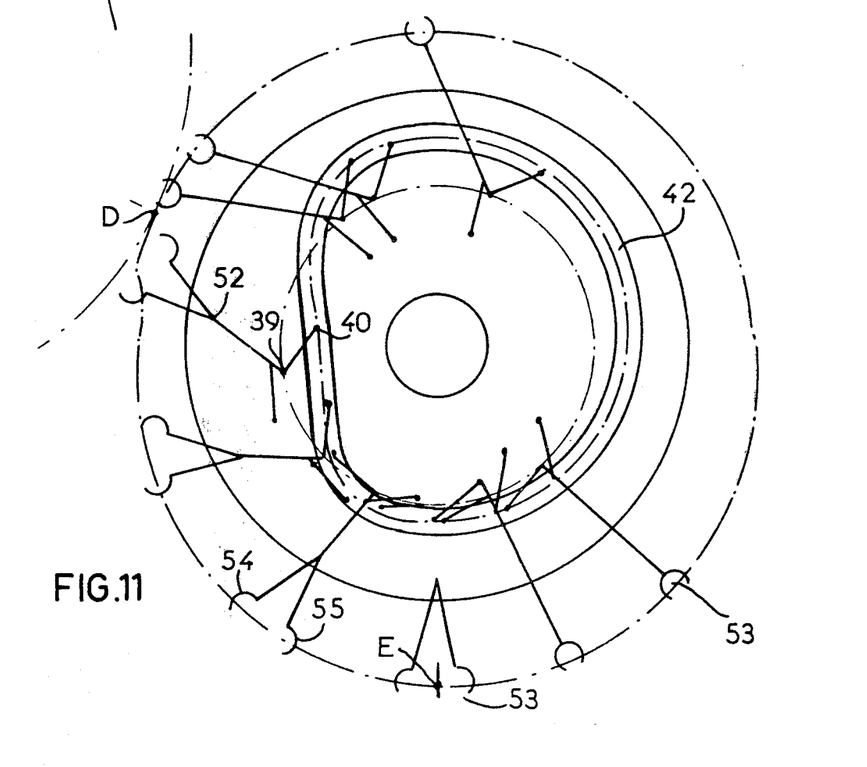
FIG. 11 illustrates schematically the movement of the transfer station arms.

As shown in FIGS. 4 and 5, each blank is a cylindrical assembly with a base 6 and an open neck 7 which exhibits the definitive shape of the bottle being made. The neck 7 has an exterior collar 8.

Figure 1:
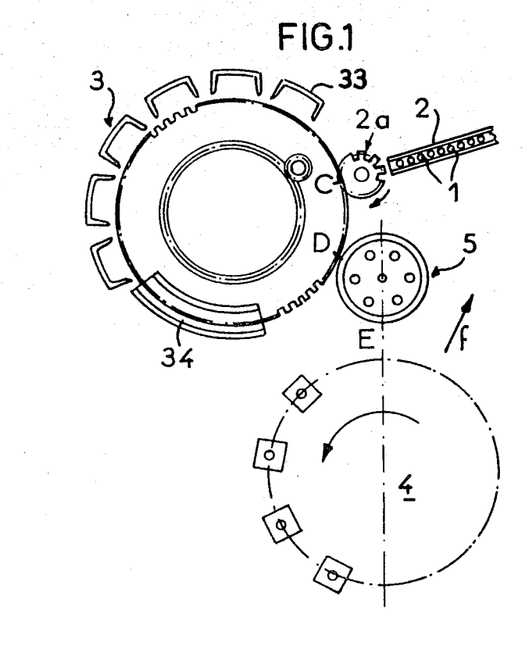
FIG. 1 is a schematic plan view of an installation for manufacturing plastic bottles according to the invention.

The rack 2 is a simple inclined groove or pair of track rails in which the blanks 1 are suspended by their collars 8. A notched wheel or star wheel 2a passes the blanks from the point where they leave the rack 2 to station 3 in synchronization with the latter's rotation. The directions of movement are shown in FIG. 1.

The station 3 where the blanks are thermally treated comprises (FIGS. 1-5) a turntable 9 rotated on a frame 10 by a sprocket wheel 11 fixedly attached to a shaft 12 driven by an electric motor (not shown).

A turntable 13 integral with table 9, is provided with notches 14 evenly distributed around its periphery. This turntable 13 can be provided with circulation channels for cooling water (not shown). Blank support devices 15 are equal in number to the notches 14 and are supported by the turntable 1. In the present example there are sixty-six notches 14.

Figure 2:
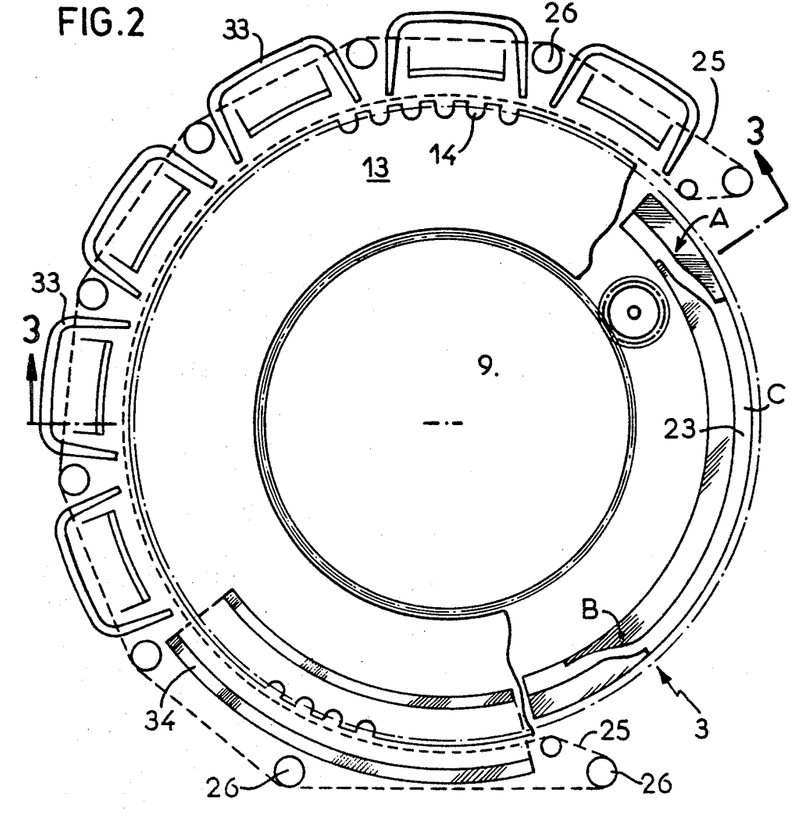
FIG. 2 is a schematic plan view in larger scale showing the thermal treatment station.
Figure 3:
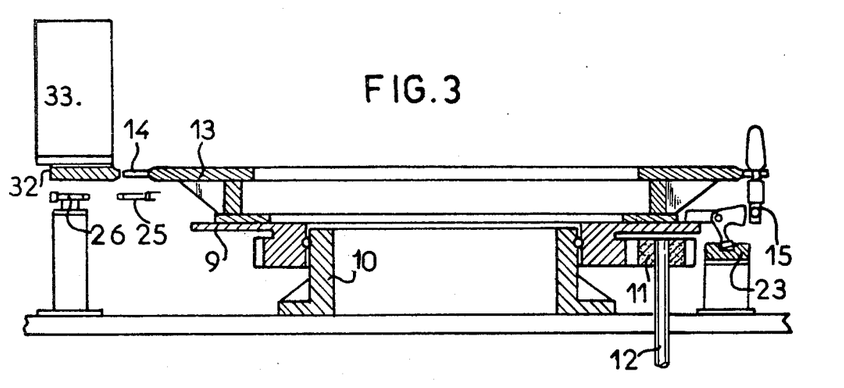
FIG. 3 is a sectional view taken along line 3—3 of FIG. 2.

Each device 15 comprises (FIGS. 4 and 5) and cylindrical tube 16 rotatably attached to a horizontal axle 17 of table 9, and supports a sprocket wheel 18. This sprocket meshes with a toothed segment 19 oscillatingly mounted on a horizontal axle 20, also supported by the table 9. The toothed segment 19 is rotated by an integral arm 21 supporting at its extremity a roller 22 guided in a horizontal cam track 23, solid with frame 10 of the thermal treatment station 3. As shown in FIG. 2, the shape of the cam track 23 turns tube 16 initially 180° to a point behind star wheel 2a (point A) and then turns the tube a second 180° to the release point of station 3 (point B).

The cylindrical tube 16 supports on its exterior a sprocket wheel 24 which meshes with a selectively movable horizontal chain 25 supported by rollers 26, solid with frame 10 (FIG. 2). In addition, the tube 16 supports on its interior a sliding rod 27 provided with an elastic split ring 28 at one extremity having a free exterior diameter slightly greater than the internal diameter of neck 7 of the blank 1. This sliding rod 27 is controlled by an arm 29 articulated thereto at its middle and supporting at one extremity a spring opposed roller 30 (spring not shown) that rides on a cam track 31. The roller tends to push the rod 27 out of tube 16. The rod 27 and its ring 28 as well as the sprocket 24 and a sleeve 24a solid therewith and keyed to the rod, are able to freely rotate around their vertical axis.

A fixed table 32 surrounds the turntable 13 in a circular arc at a slight radial distance, and supports infrared heat sources 33 which heat the blanks. The table 32 extends from point A and is continued from point B by a thermal treatment tunnel 34, designed to assure uniform blank temperature. The stationary table 32 can be equipped with a water circulation cooling system (not shown).

The transfer or conveyor station 5 comprises (FIGS. 6-12) a stationary frame 35 in which a vertical shaft 36 extends, forming a spindle to rotate the thermal treatment station synchronously with drive shaft 12.

This shaft 36 rotates a plate 37 carrying six conveyor arms 38, evenly distributed around its periphery and supported on a vertical spindle shaft 39 in orifices in plate 37. The arms 38 are rotated relative to plate 37 by a lever 40 supporting a roller 41 guided in a stationary cam track 42 in stationary frame 35.

Each conveyor arm 38 comprises a stirrup 43 supported by arm 39 and in which a horizontal rod 44 slides, countered by a spring 45 supported by the stirrup. This rod 44 carries, between the stirrup arms, a support 46 attached by a pointed screw 47. This support 46 carries a roller 48 on its lower side which cooperates with a groove 49 in the stirrup to prevent the rod 44 from turning around its axis in the support, and a roller 50 on its upper side which cooperates with a cam 51 supported by an upper stationary plate 52. The rod 44 supports at its outer extremity a pincer 53 with two articulated jaws 54, 55 meshed together by teeth 56, 57, respectively, and biased closed by a spring 58. A horizontal rod 59, articulated to pincer 53 is also articulated to horizontal lever 60, pivoting around its middle on the upper part of support 46 and supporting on its other extremity a roller 61 that cooperates with stationary cam runs 62 and 63 in the upper plate 52 designed to successively open the pincer 53 twice against the force of spring 58.

The blowing station 4 (FIGS. 12-16) comprises a vertical axle 64 turning synchronously with stations 3 and 5 and supporting ten molds 65 with vertical axes, distributed evenly around its periphery.

Figure 16:
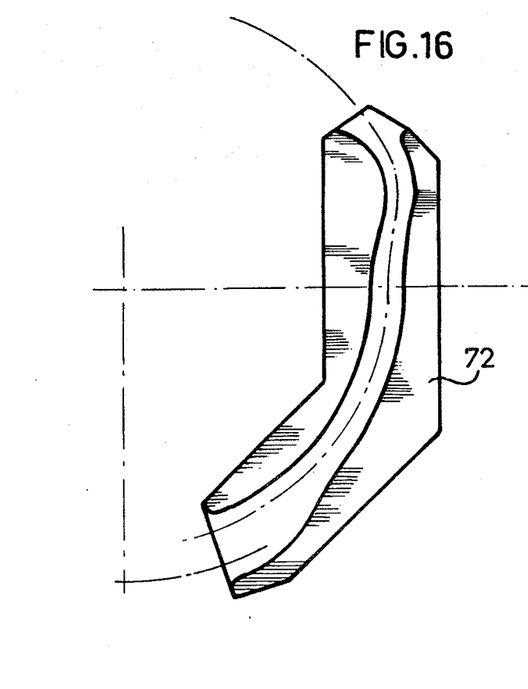
FIG. 16 is a schematic view of the mold maneuvering cam of the blowing station.

Each mold 65 is composed of two half molds 66, opening circumferentially, and a lower mold base 67 that is vertically displaceable. The two half molds 66 of a single mold 65 are rotatingly scissor mounted around an exterior vertical axle 68 supported by a plate 69 which is rotated by axle 64. The mold is opened and closed by an arm 70 rotating in plate 69 and controlled by a roller 71 that cooperates with a stationary cam track 72 (FIG. 16). The base 67 of the mold is attached to the upper extremity of a rod 73 sliding in rotating plate 69, a roller 74 extending outwardly from this rod rides on a stationary circular cam rail 75.

Figure 12:
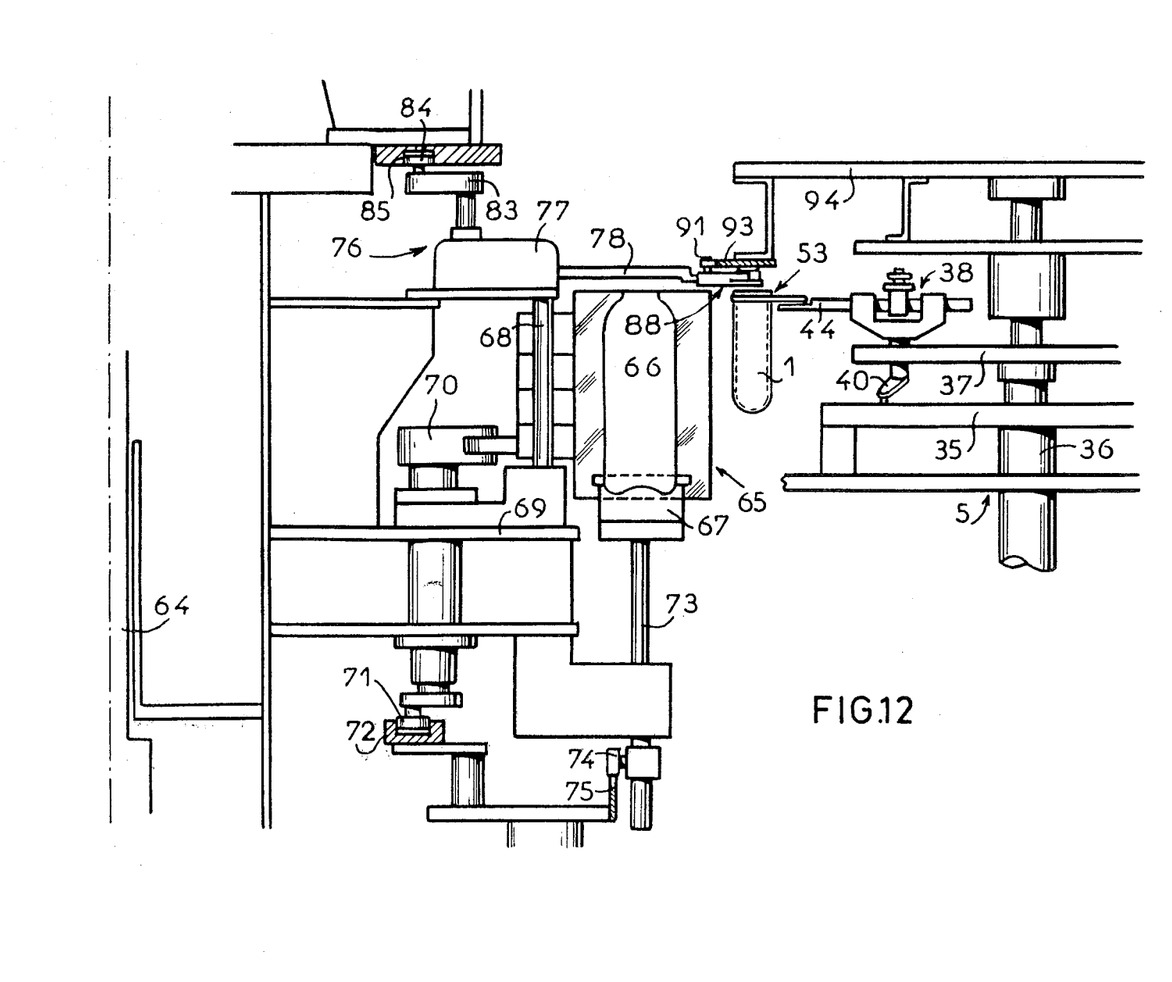
FIG. 12 is a schematic elevation view of the transfer station and blowing installation.
Figures 13, 14:
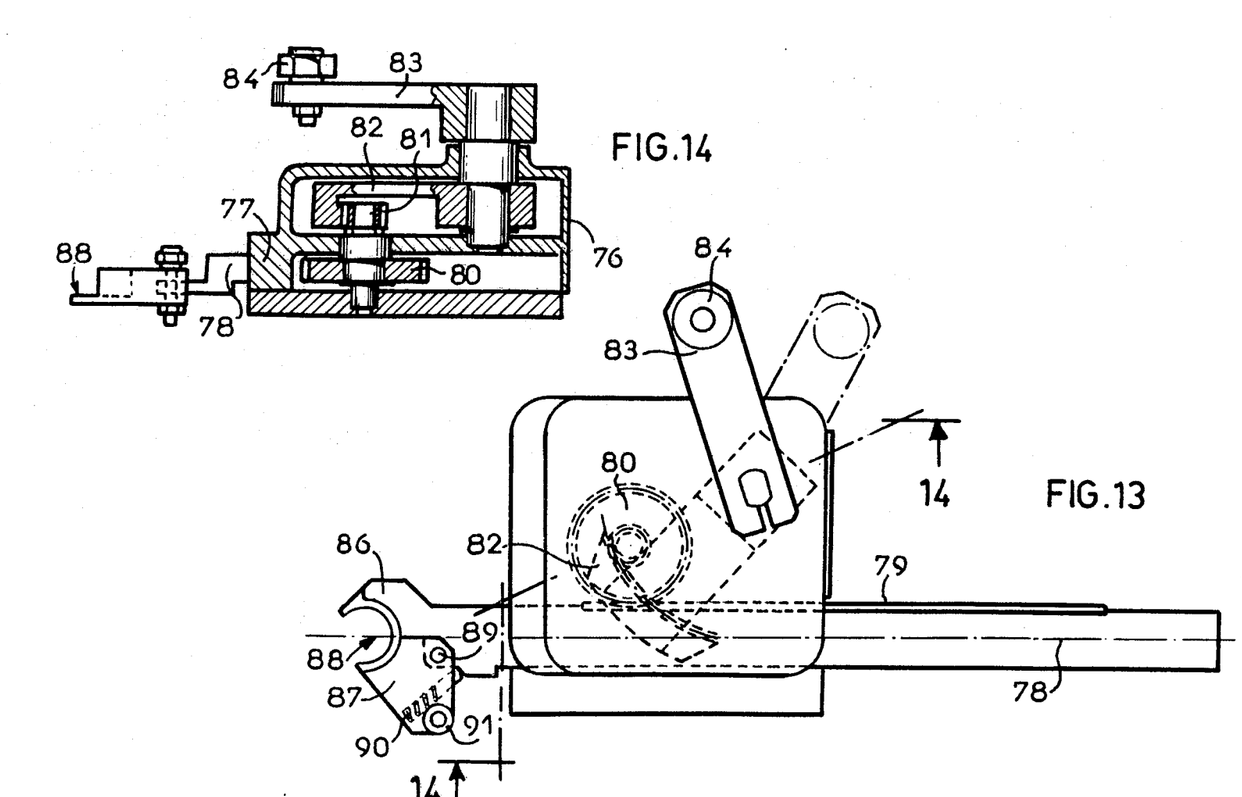
FIG. 13 is an enlarged schematic view of a positioning apparatus of the blowing station.
FIG. 14 is a sectional view taken along line 14—14 of FIG. 13.
Figure 15:
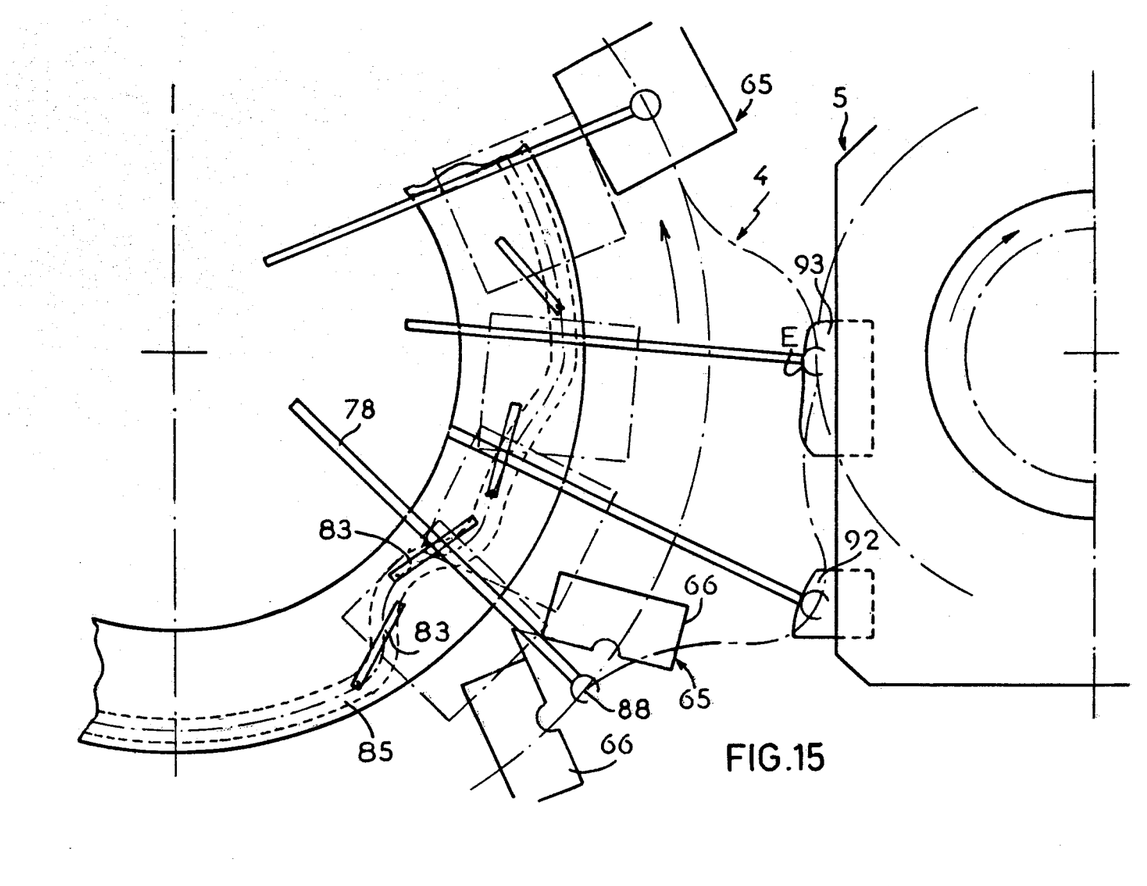
FIG. 15 schematically illustrates the displacement of the positioning apparatus arms.

Station 4 also comprises, for each mold 65, a positioning device 76 (FIGS. 14 and 15) comprising a gear case 77 attached to plate 69 and in which a horizontal arm 78 slides. The arm 78 has a rack 79 along one edge which engages a toothed pinion 80 within the gear case 77, connected to another pinion 81 that meshes with a toothed segment 82. The latter pivots in the gear case 77 and is connected to an arm 83 that is provided at its extremity with a roller which cooperates with a stationary cam track 85. The arm 78 supports, at its extremity, a stationary hook 86 and a mobile hook 87 which forms a pincer 88 with hook 86. The hook 87 is articulated by an axle 89 to the extremity of arm 78 and is biased towards its closed position by a spring 90 attached to arm 78. The articulated hook 87 mounts a roller 91 at its extremity cooperable with cam tracks 92 and 93, held by a stationary plate 94 of transfer station 5 (FIGS. 12 and 15). The two cams open the hook 87 to eject the blown bottle and to grasp a blank delivered by the transfer station.

In operation, the blanks 1 arrive by gravity from the rack 2 and are successively distributed to blank support devices 15 by the star wheel 2a, these support devices turning with the table 13 and the split ring 28 being directed toward the base but retracted from the tube by the cam 31, as shown in broken lines in FIG. 4.

When a support device 15 passes above a blank (tangent point C between table 13 and star wheel 2a), the cam 31 releases the roller 30, allowing the split ring 28 to descend and to enter by force slightly into the neck of the blank, which is at that moment suspended by its neck in a notch of star wheel 2a. The blank then leaves the star wheel 2a and is taken to the thermal treatment station 3, where it is first inverted by the cam 23 (FIG. 5), and then continuously rotated by the rolling of sprocket wheel 24 on chain 25. In traveling past the infrared radiation heat sources 33 and turning, the thereafter traversing the tunnel 34, it is uniformly heated. Before leaving station 3 the rotation of the blank stops, and it is turned back to the FIG. 4 orientation by cam 23.

The massive turning wheel 13 and stationary table 32 which surrounds it serve as heat sinks and prevent the heat from sources 33 from reaching the neck 7 of the blank, which during heating is located in a notch 14 as shown in FIG. 5. The neck thus remains cool and retains the shape it was given at the time the blank was injection molded. A cooling device can be provided as an adjunct to wheel 13 and table 33 to help keep the neck of the blank cool.

When each blank leaves the thermal treatment station 3 it is grasped by an arm 38 of transfer station 5. The arms 38, in the proximity of the tangent point D of station 3, have a trajectory and a speed which tends to blend with those of the support devices 15 to assure that the neck of the blank is securely grasped by the pincer 53. This result is obtained due to the shape of the cam 41 and the combination of the action of this cam, which defines the orientation of the rod 44, with that of cam 51, which induces a momentary retraction. Of course, at point D the cam 63 opens the pincer 53, which is thereafter reclosed by spring 58.

The blank is transferred from transfer station 5 to blowing station 4 at point E, the tangent point of the two stations. The arm 78 of the positioning device 76 grasps the neck of the blank 1, with the pincer 88 located slightly above the level of pincer 53 of arm 44. More precisely, when approaching point E the cam 85 causes the arm 78 to extend, and the position of the roller 91, in contact with the cam 93 on station 5, opens the pincer 88 to receive the neck of a blank 1 (FIGS. 12 and 15). At that instant the cam 62 of station 5 opens the corresponding pincer 53, thereby transferring the blank. To assure correct transfer, cam 85 modifies the extension of arm 78 in the vicinity of point E to access a relatively long zone in which the blank is lodged in pincer 53 and in pincer 88 simultaneously.

Cam 85 then causes arm 78 to retract and position the blank in the associated mold 65, and cams 72 and 75 (FIG. 12) cause the mold and its base 67 to close. After almost one turn of plate 69, the cams 75 and 72 open the mold 65, cam 85 extends arm 78, and cam 92 opens the pincer 88; the finished bottle than falls into a removal device (not shown) and the pincer 88 is closed again by spring 90 to start a new, identical cycle.

The installation according to the invention thus correctly positions the blanks at different stations and keeps the neck of the blank cool, allowing the neck to be used to directly manipulate the blanks with jaws and pincers, without the intervention of auxiliary support devices repeatedly from one station to another. The movement of the arms 38 of the transfer station 5 and the positioning devices 76 of the blowing station 4 allow the blanks to be correctly transferred with high speed grasping due to the relatively long transfer zone.

In the thermal treatment station, the chain drive rotation of the blanks around their own axes makes it possible to tie the rotation speed of the blanks themselves to the rotation speed of the table. The result is a constant number of revolutions of the blanks which matches the rotation speed of the table. A change in the displacement speed of the chain 25 can change this number of revolutions.

It should also be noted that no mechanical device is located above the blanks, so that the heating devices can be located above the blanks in order to provide that their base is thermally treated at station 3. As the heated blank is returned after thermal treatment, it is not allowed to deform when being transferred to the blowing station.

In the blowing station, when the blank has its neck turned downward and is kept in that attitude, the bottles are easily removed by simple gravity.

Because the conveyor station 5 has a variable pitch, station 3, which transports the blanks with a small radial dimension, can have a pitch much smaller than station 4, which contains the blown bottles.

It is possible, as a variation, to join to each mold 65 in the blowing station an axial blank stretching device (not shown) comprising a rod that penetrates into the blank before or during blowing by conventional means, not shown.

As another possible variation, one can provide, in the thermal treatment station 3, a return device 18-22 for two adjacent tubes 16; each toothed section 19 is thus located in front of a median zone of a double support articulated on an axle 11 and carrying these two tubes 16.

What is claimed is:

1. An installation for manufacturing hollow bodies, such as bottles, by thermally treating and then blow molding cylindrical blanks (1) made of a plastic material with one extremity closed and one extremity open forming a neck, said installation comprising:
    (a) a thermal treatment station (3) including a turntable (9), a stationary table (32) surrounding said turntable, a plurality of heating devices (33) mounted around a peripheral portion of said stationary table, a plurality of blank support devices (15) mounted on the turntable and rotatable therewith in close proximity to said heating devices, and means for inverting said blank support devices when entering and leaving said peripheral portion of the stationary table mounting said heating devices such that blanks carried by said support devices have their neck openings directed upwardly outside said peripheral portion and downwardly inside said portion,
    (b) a station (2, 2a) for individually supplying blanks to said support devices,
    (c) a blow molding station (4), and
    (d) a station (5) for transferring blanks from said support devices after leaving said peripheral portion to said blow molding station.

2. Installation according to claim 1, wherein each support device (15) comprises a sliding rod (27) having an inside gripping organ (28) for engaging the inside of the neck (7) of a blank, and means (29–31) for reciprocating said rod within a sleeve (16) of said support device in synchronization with the movement thereof.

3. Installation according to one of claims 1 or 2, wherein the transfer station (5) comprises means (53) mounted on a turntable (37) for gripping each blank (1) by the outside of its neck (7) when leaving the thermal treatment station (3).

4. Installation according to claim 3, wherein the transfer station (5) comprises means for simultaneously varying the angular and trajectoral speed of said gripping means (53), the turntable which supports the gripping means being rotated in synchronization with the turntable (9) of the treatment station (3).

5. Installation according to claim 4, wherein the transfer station (5) comprises cam means (42, 51) for making the gripping means (53) follow the trajectory of each blank (1) for a predetermined distance in the vicinity of a tangent point (D) between the transfer station and the thermal treatment station.

6. Installation according to claim 3, wherein the gripping means (53) is mounted at the extremity of an arm (44) rotatingly mounted on said turntable (37), said arm being movable away from or towards the center of the turntable by cams (51, 62, 63) and being rotatable relative to said turntable by a stationary cam (42).

7. Installation according to claim 3, wherein the blowing station (4) comprises means (88) for grasping each blank (1) by its neck (7) when leaving the transfer station (5), and the transfer station comprises means (61–62) for simultaneously releasing the blank.

8. Installation according to claim 7, wherein the grasping means (88) of the blowing station comprises pincers operated synchronously with the gripping means (53) of the transfer station.

9. Installation according to claim 8, wherein the blowing station comprises cam means (85) for causing the grasping means (88) to follow the trajectory of each blank (1) for a predetermined distance in the vicinity of a tangent point (E) between the blowing station and the transfer station.

10. Installation according to claim 9, wherein the pincers (88) of the blowing station are mounted on a movable arm (78) for positioning the blank in a blow mold (65) and then removing the blank by gravity.

11. Installation according to claim 10, wherein each mold (65) of the blowing station is associated with a means (88) for grasping a blank.

* * * * *